United States Patent
Mukai

(10) Patent No.: US 11,386,175 B2
(45) Date of Patent: Jul. 12, 2022

(54) CONTENT RECOMMENDATION APPARATUS, METHOD OF CONTENT RECOMMENDATION, AND CONTENT RECOMMENDATION SYSTEM

(71) Applicant: SHARP KABUSHIKI KAISHA, Sakai (JP)

(72) Inventor: Toshiroh Mukai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 43 days.

(21) Appl. No.: 16/650,788

(22) PCT Filed: Jul. 10, 2018

(86) PCT No.: PCT/JP2018/026070
§ 371 (c)(1),
(2) Date: Mar. 25, 2020

(87) PCT Pub. No.: WO2019/064814
PCT Pub. Date: Apr. 4, 2019

(65) Prior Publication Data
US 2020/0242179 A1    Jul. 30, 2020

(30) Foreign Application Priority Data
Sep. 28, 2017    (JP) .............................. JP2017-189059

(51) Int. Cl.
G06F 7/02    (2006.01)
G06F 16/00    (2019.01)
G06F 16/9535    (2019.01)
G06F 16/9538    (2019.01)

(52) U.S. Cl.
CPC ...... *G06F 16/9535* (2019.01); *G06F 16/9538* (2019.01)

(58) Field of Classification Search
CPC ............. G06F 16/9535; G06F 16/9537; G06F 16/9538
See application file for complete search history.

(56) References Cited

U.S. PATENT DOCUMENTS

| 9,779,179 | B2 * | 10/2017 | Nordstrom ........ G06F 16/90324 |
| 10,133,545 | B2 * | 11/2018 | Gibson .............. H04N 21/2407 |
| 2009/0178083 | A1 | 7/2009 | White et al. |
| 2009/0216639 | A1 * | 8/2009 | Kapczynski ....... G06Q 30/0207 |
| | | | 705/14.1 |

(Continued)

FOREIGN PATENT DOCUMENTS

| JP | 2011-015234 A1 | 1/2011 |
| JP | 2012-023636 A1 | 2/2012 |

(Continued)

*Primary Examiner* — Bruce M Moser
(74) *Attorney, Agent, or Firm* — ScienBiziP, P.C.

(57) ABSTRACT

A content recommendation apparatus selects an application for executing a content, by referring to a view history corresponding to a prime time, selects, as recommendation contents in the prime time, more contents that are executed by the selected application than contents that are executed by an application other than the selected application, and outputs recommendation-content information about the selected recommendation contents. The content recommendation apparatus recommends a suitable content timely.

8 Claims, 7 Drawing Sheets

(56) References Cited

U.S. PATENT DOCUMENTS

| | | | |
|---|---|---|---|
| 2013/0247103 A1 | 9/2013 | White et al. | |
| 2017/0025152 A1* | 1/2017 | Jaime | G06F 3/0481 |
| 2017/0116161 A1* | 4/2017 | Stein | G06F 3/04842 |
| 2018/0349478 A1* | 12/2018 | Carlisle | G06F 16/337 |

FOREIGN PATENT DOCUMENTS

| | | |
|---|---|---|
| JP | 2013-247544 A1 | 12/2013 |
| JP | 5619621 B2 | 11/2014 |

* cited by examiner

FIG. 3

| ITEM No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| SUM | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 5 | 2 | 0 | 0 | 0 | 0 | 0 | 0 | 0 | 0 | 0 | 0 | 0 | 0 | 0 | 0 | 0 | 0 | 0 |
| SUN | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| MON | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 0 | 0 | 0 | 0 | 0 | 0 | 0 | 0 | 0 | 0 | 0 | 0 | 0 | 0 | 0 | 0 | 0 |
| TUE | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| WED | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| THU | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 2 | 1 | 0 | 0 | 0 | 0 | 0 | 0 | 0 | 0 | 0 | 0 | 0 | 0 | 0 | 0 | 0 | 0 | 0 | 0 |
| FRI | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 4 | 0 | 0 | 0 | 0 | 0 | 0 | 0 | 0 | 0 | 0 | 0 | 0 | 0 | 0 | 0 | 0 | 0 | 0 |
| SAT | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| TERMINAL ID | PRIME-TIME INFORMATION | |
| --- | --- | --- |
| | APPLICATION TYPE | PRIME TIME |
| ATV010001 | VOD | 13, 14, 15 |
| ATV010002 | VOD | 20, 21, 22 |
| ATV010002 | Music | 10, 11 |
| ATV010010 | Game | 22 |
| ... | ... | ... |

(a)

(b)

CONTENT RECOMMENDATION APPARATUS, METHOD OF CONTENT RECOMMENDATION, AND CONTENT RECOMMENDATION SYSTEM

TECHNICAL FIELD

One aspect of the present invention relates to a content recommendation apparatus, a method of content recommendation, and a content recommendation system that includes the content recommendation apparatus.

BACKGROUND ART

A known technique (c.f., Patent Document 1) is to generate, based on a user view history, a list of recommendation contents composed of various types of contents, such as broadcast programs, moving pictures, music pieces, and games, and to provide the user with the list.

CITATION LIST

Patent Literature

Patent Document 1: Japanese Patent No. 5619621, registered on Sep. 26, 2014

SUMMARY OF INVENTION

Technical Problem

A conventional system unfortunately fails to reflect the timing for content recommendation because contents, such as moving pictures, music pieces, and games, often have unlimited time for use (in other words, unlike broadcast programs, these contents are often available at any time). The conventional system hence requires an improvement in timely content recommendation.

To solve this problem, the present invention provides a technique of recommending a suitable content timely.

Solution to Problem

To solve the above problem, one aspect of the present invention provides a content recommendation apparatus that includes a storage, an output unit, and a controller. The controller stores a view history of a content in the storage. The controller also selects an application for executing the content by referring to the view history corresponding to a particular period of time. The controller also selects, as recommendation contents in the particular period of time, more contents that are executed by the selected application than contents that are executed by an application other than the selected application. The controller also outputs recommendation-content information about the selected recommendation contents via the output unit during a period of time that is prior to the particular period of time.

To solve the above problem, another aspect of the present invention provides a method of content recommendation. The method includes the following steps: storing a view history of a content; selecting recommendation contents in a particular period of time; and outputting recommendation-content information about the selected recommendation contents during a period of time that is prior to the particular period of time. The selecting step includes the following: selecting an application for executing the content, by referring to the view history corresponding to the particular period of time; and selecting, as the recommendation contents in the particular period of time, more contents that are executed by the selected application than contents that are executed by an application other than the selected application.

To solve the above problem, still another aspect of the present invention provides a content recommendation system that includes a content recommendation apparatus, and a notification apparatus. The content recommendation apparatus includes a storage, an output unit, and a content-recommendation-apparatus controller. The content-recommendation-apparatus controller stores a view history of a content in the storage. The content-recommendation-apparatus controller also selects an application for executing the content, by referring to the view history corresponding to a particular period of time. The content-recommendation-apparatus controller also selects, as recommendation contents in the particular period of time, more contents that are executed by the selected application than contents that are executed by an application other than the selected application. The content-recommendation-apparatus controller also outputs recommendation-content information about the selected recommendation contents to the notification apparatus via the output unit during a period of time that is prior to the particular period of time. The notification apparatus includes an acquisition unit, a notification unit, and a notification-apparatus controller. The notification-apparatus controller refers to the recommendation-content information acquired via the acquisition unit, and notifies information about the recommendation contents via the notification unit.

Advantageous Effect of Invention

The aspects of the present invention achieve timely recommendation of a suitable content.

BRIEF DESCRIPTION OF DRAWINGS

FIG. 3 is a table showing one example of a count result in the first embodiment of the present invention.

DESCRIPTION OF EMBODIMENTS

First Embodiment

Embodiments of the present invention will be detailed.
(Content Recommendation System 1)

Figure 1:
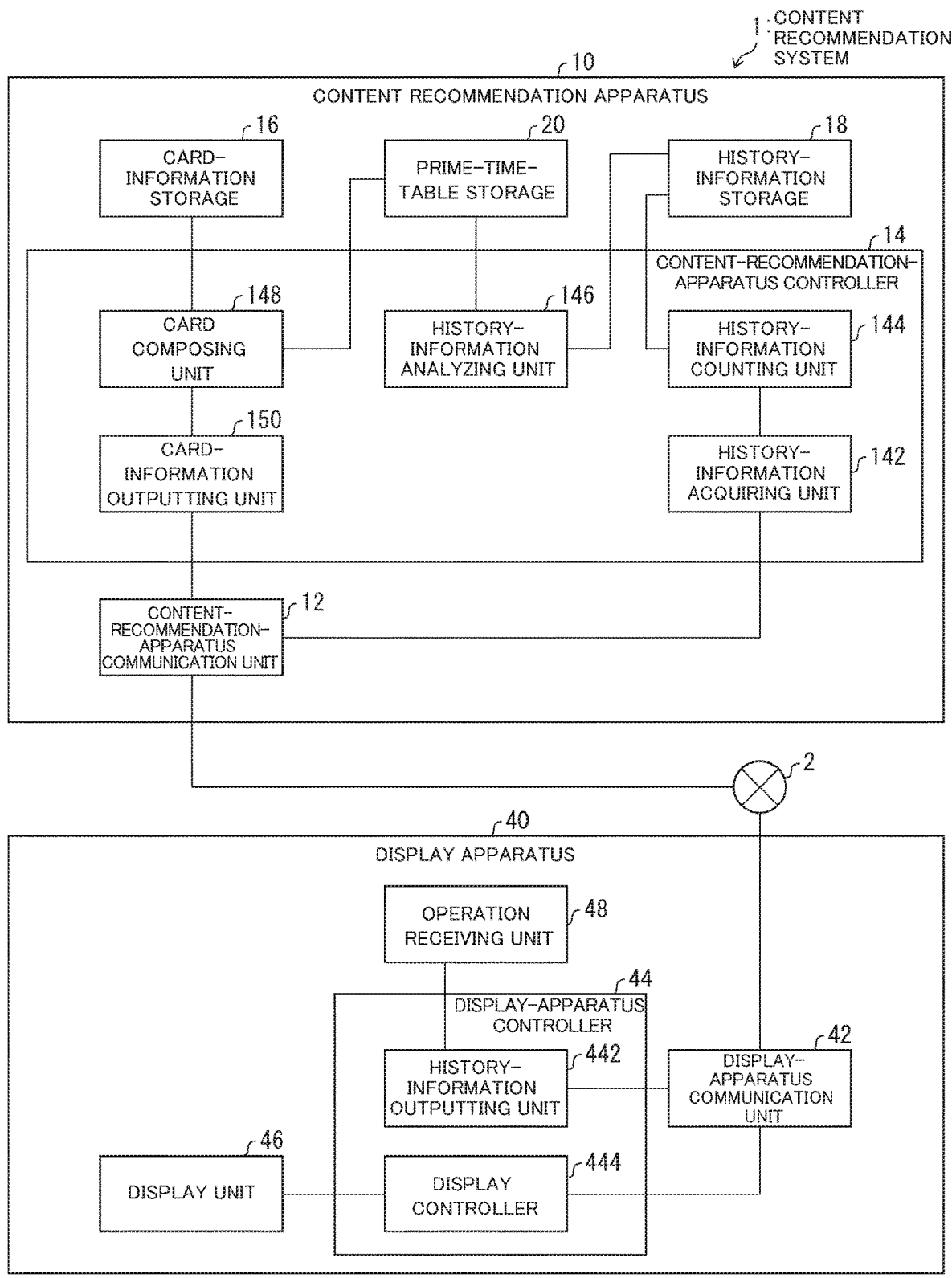
FIG. 1 is a block diagram illustrating the configuration of main components of a content recommendation system according to a first embodiment of the present invention.

FIG. 1 is a block diagram illustrating the configuration of main components of a content recommendation system 1 according to a first embodiment of the present invention. As shown in FIG. 1, the content recommendation system 1 includes a content recommendation apparatus 10 and a display apparatus (i.e., notification apparatus) 40. In the content recommendation system 1, the content recommendation apparatus 10 and display apparatus 40 are connected to each other for communication via a network 2.

In the content recommendation system 1, the content recommendation apparatus 10 selects, from among contents of multiple categories, a predetermined number of recommendation contents that are recommended to a user of the display apparatus 40 in a prime time. The content recommendation apparatus 10 then outputs card information to the display apparatus 40 during a content-recommendation time period, which is a period of time prior to the prime time. The card information includes recommendation-content information about the selected recommendation contents, and is for recommending the recommendation contents.

The prime time herein means a period of time during which a certain application has been executed frequently. This frequent application execution occurs when there is an imbalance in period of time during which the certain application has been executed. In other words, the prime time means a period of time during which the certain application has been executed intensively. The number of times of execution per se is small (e.g., twice in two weeks) in some cases even when there is an imbalance in period of time during which the certain application has been executed. Accordingly, this time period of execution may be excluded from the prime time. With reference to another drawing, the Description will detail later on how the content recommendation apparatus 10 determines whether such a time period of frequent execution falls under the prime time.

The recommendation contents herein are contents determined by referring to, for instance, a user view history of a content. Further, the wording "same category" means that contents are of the same type. In the Description, content types include, but not limited to, a music piece, a game, a moving picture (implemented by a system called video on demand or VOD for short), and a broadcast program.

In the Description, multiple applications of the same type are regarded as a single application. For instance, there are multiple VOD applications that can replay moving pictures. Executing any of the VOD applications is still regarded as the execution of a VOD application. The present invention is however not limited to this configuration; in some embodiments, executing applications may be regarded as the individual execution of each application.

By way of example only, the Description uses, as application types, a music application for replaying a music content, a game application for executing a game, a VOD application for replaying a moving picture, and a broadcast-program application for replaying a broadcast program contained in a broadcast wave received by the display apparatus 40.

The display apparatus 40 acquires the card information, and recommends recommendation contents by referring to the card information. More specifically, the display apparatus 40 shows each recommendation content as a card. Upon user selection of a card, the display apparatus 40 replays the content (or executes the content; hereinafter, these verbs are interchangeable) corresponding to the selected card.

The Description describes, but not limited to, a configuration where the content recommendation apparatus 10 in the content recommendation system 1 outputs pieces of card information for recommending four recommendation contents. For instance, the content recommendation apparatus 10 may output pieces of card information for recommending five or more contents, and the display apparatus 40 may select four out of the five or more contents, thus recommending the four selected contents. Alternatively, the content recommendation apparatus 10 may assign priorities to respective contents, and the display apparatus 40 may select recommendation contents by referring to the priorities.

(Content Recommendation Apparatus 10)

As shown in FIG. 1, the content recommendation apparatus 10 includes a content-recommendation-apparatus communication unit (i.e., output unit) 12, a content-recommendation-apparatus controller (controller) 14, a card-information storage 16, a history-information storage (storage) 18, and a prime-time-table storage (storage) 20.

The content recommendation apparatus 10 determines recommendation contents from view histories of contents recorded in the history-information storage 18, on the basis of the series, type and performer information of the contents. The content recommendation apparatus 10 also stores information about the recommendation contents as card information. The content recommendation apparatus 10 may determine the information about the recommendation contents or the card information, by using recommendation information that is not based on the view histories of the contents. Examples of such recommendation information include a content list recommended by a content provider and a piece of ranking information. Further, the content recommendation apparatus 10 may acquire these information pieces, including the information about the recommendation contents or the card information, the recommended content list, and the ranking information, from an information providing server not shown or from other things.

The content-recommendation-apparatus communication unit 12 is a communication interface for communication with an external apparatus via the network 2. More specifically, the content-recommendation-apparatus communication unit 12 outputs recommendation-content information.

The content-recommendation-apparatus controller 14 controls each component of the content recommendation apparatus 10 when, for instance, one or more processors (e.g., CPUs) execute programs stored in a memory (e.g., a random access memory or RAM for short, and a read only memory or ROM for short). The content-recommendation-apparatus controller 14 will be detailed later on.

The card-information storage 16 stores card information that is to be output by the content recommendation apparatus 10. The card-information storage 16 is implemented by a non-volatile rewritable memory, such as an EPROM, EEPROM (registered trademark), HDD, or flash memory.

Under the control of the content-recommendation-apparatus controller 14, the history-information storage 18 stores history information including view histories of contents. These view histories of the contents are each a history indicating that the content has been viewed (e.g., a history indicating that a broadcast program or moving picture has been viewed, a history indicating that a music piece has been replayed, and a history indicating that a game has been executed). This content view history may include, for instance, information indicating a content that has been viewed, a terminal ID for identifying the display apparatus 40, the type of an application that has been executed in the display apparatus 40, and information indicating the time when the application has been executed. The content-recommendation-apparatus controller 14 may determine these items of history information or acquire them from an external viewing apparatus not shown or from other apparatuses. The history information stored in the history-information storage 18 may be in any form; in the Description, the count result of the history information is stored. The count result will be detailed with reference to another drawing. The history information stored in the history-information storage 18 may include information indicating that the power source of the display apparatus 40 has switched ON (or OFF).

In some embodiments, the history information may be information indicating a user ID for user identification, instead of a terminal ID. The history-information storage 18 is implemented by a non-volatile rewritable memory, such as an EPROM, EEPROM, HDD, or flash memory.

The prime-time-table storage 20 stores, as a prime-time table, information for selecting card information that is to be output. The prime-time-table storage 20 is implemented by a non-volatile rewritable memory, such as an EPROM, EEPROM, HDD, or flash memory.

(Content-Recommendation-Apparatus Controller 14)

As shown in FIG. 1, the content-recommendation-apparatus controller 14 functions also as a history-information acquiring unit 142, a history-information counting unit 144, a history-information analyzing unit 146, a card composing unit 148, and a card-information outputting unit 150.

The history-information acquiring unit 142 acquires history information via the content-recommendation-apparatus communication unit 12.

The history-information counting unit 144 counts the history information and stores the count result in the history-information storage 18.

The history-information analyzing unit 146 refers to the count result stored in the history-information storage 18, to thus prepare and update a prime-time table, and stores the prepared and updated prime-time table in the prime-time-table storage 20.

The card composing unit 148 selects a particular category from among multiple categories by referring to the prime-time table stored in the prime-time-table storage 20. The card composing unit 148 then selects, as recommendation contents, more contents of the selected particular category than contents of the other categories. The card composing unit 148 outputs card information that includes recommendation-content information about the recommendation contents, to the card-information outputting unit 150.

The card-information outputting unit 150 outputs, via the content-recommendation-apparatus communication unit 12, the card information that has been output by the card composing unit 148.

(Display Apparatus 40)

As shown in FIG. 1, the display apparatus 40 includes a display-apparatus communication unit (i.e., acquisition unit) 42, a display-apparatus controller (i.e., notification-apparatus controller) 44, a display unit (i.e., notification unit) 46, and an operation receiving unit 48.

The display-apparatus communication unit 42 is a communication interface for communication with an external apparatus.

The display-apparatus controller 44 controls each component of the display apparatus 40 when, for instance, one or more processors (e.g., CPUs) execute programs stored in a memory (e.g., a RAM and a ROM). As shown in FIG. 1, the display-apparatus controller 44 functions also as a history-information outputting unit 442 and a display controller 444.

The history-information outputting unit 442 refers to operation information that has been output from the operation receiving unit 48 and indicates a user operation. The history-information outputting unit 442 then outputs history information via the display-apparatus communication unit 42. The history-information outputting unit 442 may output the history information under any condition; for instance, the history-information outputting unit 442 may output the history information at predetermined time intervals or in response to a change in the history information (that is, the history-information outputting unit 442 may output the history information every time a content is viewed or every time an application is executed). As earlier described, the history information may include information indicating a user ID for user identification, instead of a terminal ID for identifying the display apparatus 40. In this case, each user registers his/her own user ID in advance and logs in to the display apparatus 40, thus enabling the display apparatus 40 to output the history information indicating the user ID.

The display controller 444 controls the display unit 46 to display an image.

The display unit 46 is a display device capable of displaying an image.

The operation receiving unit 48 is a device that receives a user operation. Upon receiving a user operation, the operation receiving unit 48 outputs operation information indicating the user operation.

(Process of Counting History Information)

Figure 2:
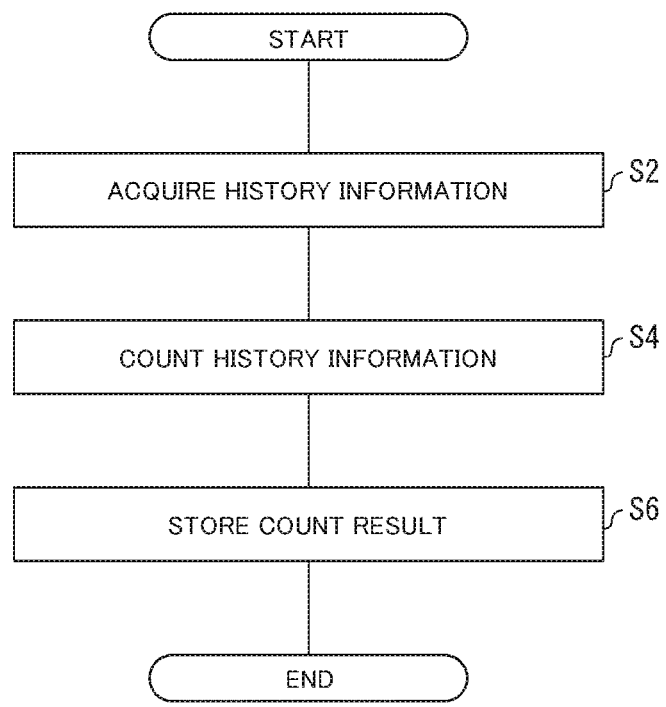
FIG. 2 is a flowchart illustrating a process in which the content recommendation apparatus according to the first embodiment of the present invention counts pieces of history information.

With reference to FIG. 2, the following describes how the content recommendation apparatus 10 counts history information (i.e., a process of storing content view histories in the history-information storage). FIG. 2 is a flowchart illustrating a process in which the content recommendation apparatus 10 in the present embodiment counts the history information.

(Step S2)

The history-information acquiring unit 142 of the content recommendation apparatus 10 acquires history information via the content-recommendation-apparatus communication unit 12. The history-information acquiring unit 142 outputs the acquired history information to the history-information counting unit 144.

(Step S4)

Upon acquiring the history information, the history-information counting unit 144 counts the history information. To be specific, the history-information counting unit 144 counts how many times an application has been execution during each period of time. The history-information counting unit 144 counts the number of times of execution, for each terminal ID and application type indicated by the history information. It is noted that the history-information counting unit 144 may count the number of times during any period of time; examples of the duration of count include 30 minutes and 1 hour. It is also noted that the history-information counting unit 144 may determine whether the acquired history information is history information about a target application to be counted. In this case, upon determining that the acquired history information is history information about an application other than the target application to be counted, the history-information counting unit 144 may end the process in FIG. 2.

(Step S6: Storing Step)

The history-information counting unit 144 stores the count result in the history-information storage 18.

(Count Result)

With reference to FIG. 3, the following describes the count result that is stored by the history-information counting unit 144. FIG. 3 is a table showing one example of the count result in the present embodiment.

FIG. 3 shows the result of history count indicating how many times a certain terminal has executed a certain application during two weeks. Each item number in FIG. 3 is a period of time denoted in number. For instance, the column of Item 1 indicates a period of time ranging from 0:00 to 0:29; and the column of Item 2 indicates a period of time ranging from 0:30 to 0:59. In other words, the count result in FIG. 3 is the number of times in which the certain terminal has executed the certain application during two weeks, the number of times being counted for every 30 minutes.

In FIG. 3, there is a numeral "2" in rows Sum and Thursday of Item 29. This means that the certain terminal has executed the certain application twice during a period of time ranging from 14:00 to 14:29 on Thursday. This also means that the certain application has been executed twice during the period of time ranging from 14:00 to 14:29, during a week.

In FIG. 3, there is a numeral "5" in the row Sum of Item 30, there is a numeral "1" in the row Thursday of the same, there is a numeral "4" in row Friday of the same. This means that the certain terminal has executed the certain application once during a period of time ranging from 14:30 to 14:59 on Thursday. This also means that the certain terminal has executed the certain application four times during the period of time ranging from 14:30 to 14:59 on Friday. This also means that the certain terminal has executed the certain application five times during the period of time ranging from 14:30 to 14:59, during a week.

In this way, the content recommendation apparatus 10 refers to the history information, and then counts which application has been executed in a certain terminal, and which period of time and how often the application has been executed in the certain terminal. The history-information storage 18 thus stores the count result for each application on a terminal-ID basis.

It is noted that other than the count result in FIG. 3, the history-information counting unit 144 may count the number of times of application execution per day. In this case, an application can be identified that is executed frequently during a particular period of time on a particular day.

In some cases, there are multiple users who use a terminal; for instance, multiple users use a single TV. The history-information counting unit 144 may accordingly count the history information for each of the multiple users. For instance, the history-information counting unit 144 may count the application executed during 16:00 to 18:00 as an application that has been executed by a child, and may count the application executed during 22:00 to 24:00 as an application that has been executed by an adult.

(Process of Updating Prime-Time Table)

Figure 4:
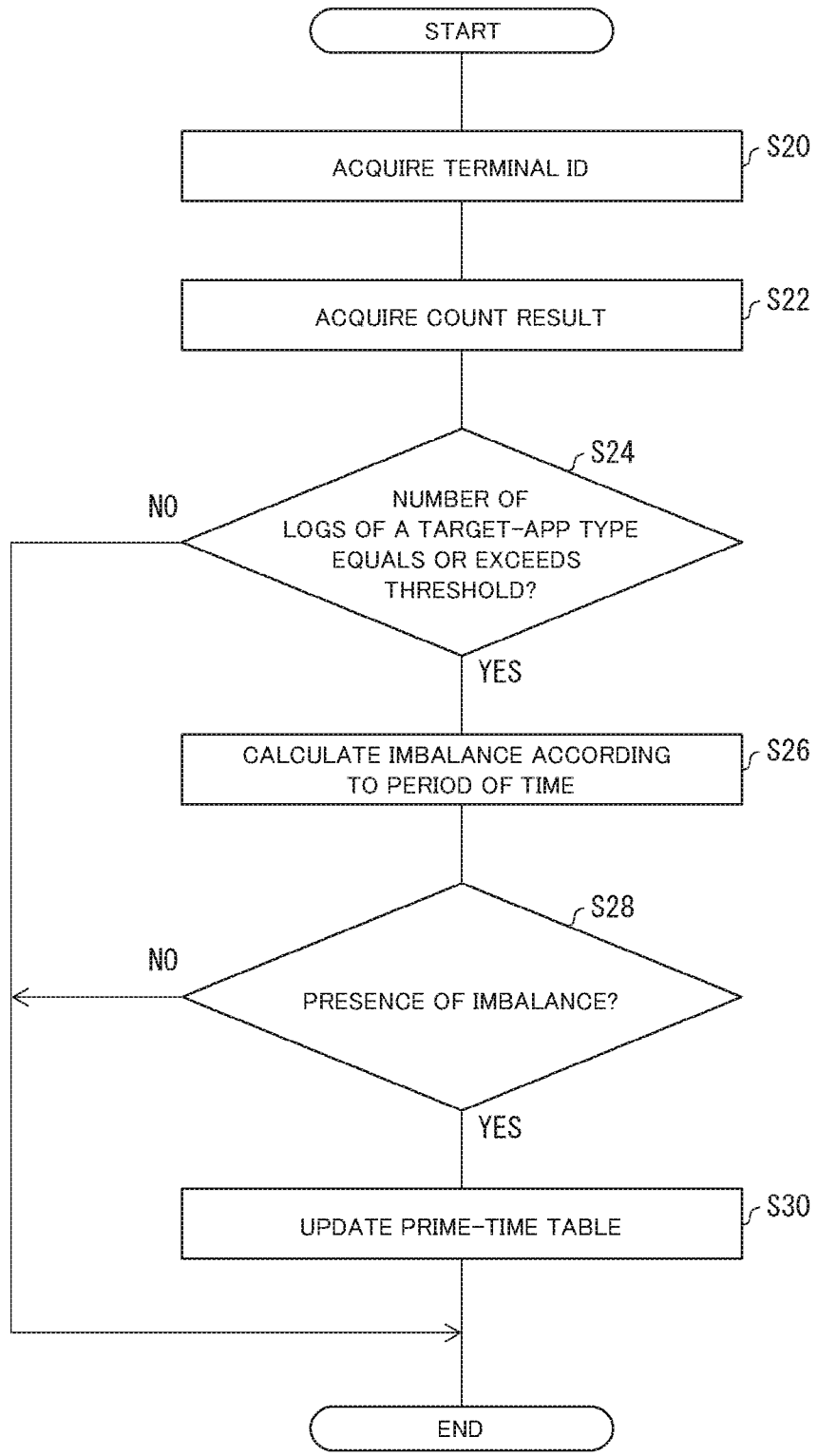
FIG. 4 is a flowchart illustrating a process in which the content recommendation apparatus according to the first embodiment of the present invention updates a prime-time table.

With reference to FIG. 4, the following describes a process in which the content recommendation apparatus 10 updates a prime-time table. FIG. 4 is a flowchart illustrating a process in which the content recommendation apparatus 10 in the present embodiment updates the prime-time table.

(Step S20)

The history-information analyzing unit 146 of the content recommendation apparatus 10 acquires a terminal ID indicating a target terminal. In some embodiments, the history-information analyzing unit 146 may determine the terminal ID of the target terminal, instead of acquiring the terminal ID.

(Step S22)

The history-information analyzing unit 146 acquires, from the history-information storage 18, the count result for a target-app type (i.e., the type of a target application) associated with the terminal ID in Step S20.

(Step S24)

The history-information analyzing unit 146 refers to the acquired count result for the target-app type, and then determines whether the number of logs (i.e., the number of times of execution) of the target-app type equals or exceeds a threshold. Here, the threshold is used for determining whether the target-app type has been executed more or less. The threshold may be set to any value, such as once a day or five times a week.

(Step S26) If determining that the number of logs of the target-app type equals or exceeds the threshold in Step S24 (i.e., if YES in Step S24), the history-information analyzing unit 146 calculates an imbalance according to period of time.

The imbalance may be calculated by any method; for instance, it may be calculated by calculating the ratio of a log to the total number of logs. For 10 logs in total and three logs during a certain period of time, the imbalance is 30%.

(Step S28)

The history-information analyzing unit 146 determines whether there is an imbalance according to period of time. The history-information analyzing unit 146 may use a threshold to determine whether there is an imbalance according to period of time. For instance, let the history-information analyzing unit 146 calculate, in Step S26, an imbalance by calculating the ratio of a log to the total number of logs, and thus determine that the calculated ratio exceeds the threshold. Accordingly, the history-information analyzing unit 146 may determine that there is an imbalance. The threshold may be set to any value, including 25%, 30%, and 50%. The threshold herein is used for determining whether a particular application has been executed according to period of time and whether a target-app type has not been executed all day long.

(Step S30: Storing Step)

If determining that there is an imbalance in Step S28 (i.e., if YES in Step S28), the history-information analyzing unit 146 defines the period of time having the imbalance, as a prime time. The history-information analyzing unit 146 then updates the prime-time table stored in the prime-time-table storage 20.

The process in FIG. 4 ends if the number of logs for the target-app type is determined to not equal or exceed the threshold (i.e., if NO in Step S24) or if no imbalance is found in Step S28 (i.e., if No in Step S28).

(Prime-Time Table)

Figures 5, 6:
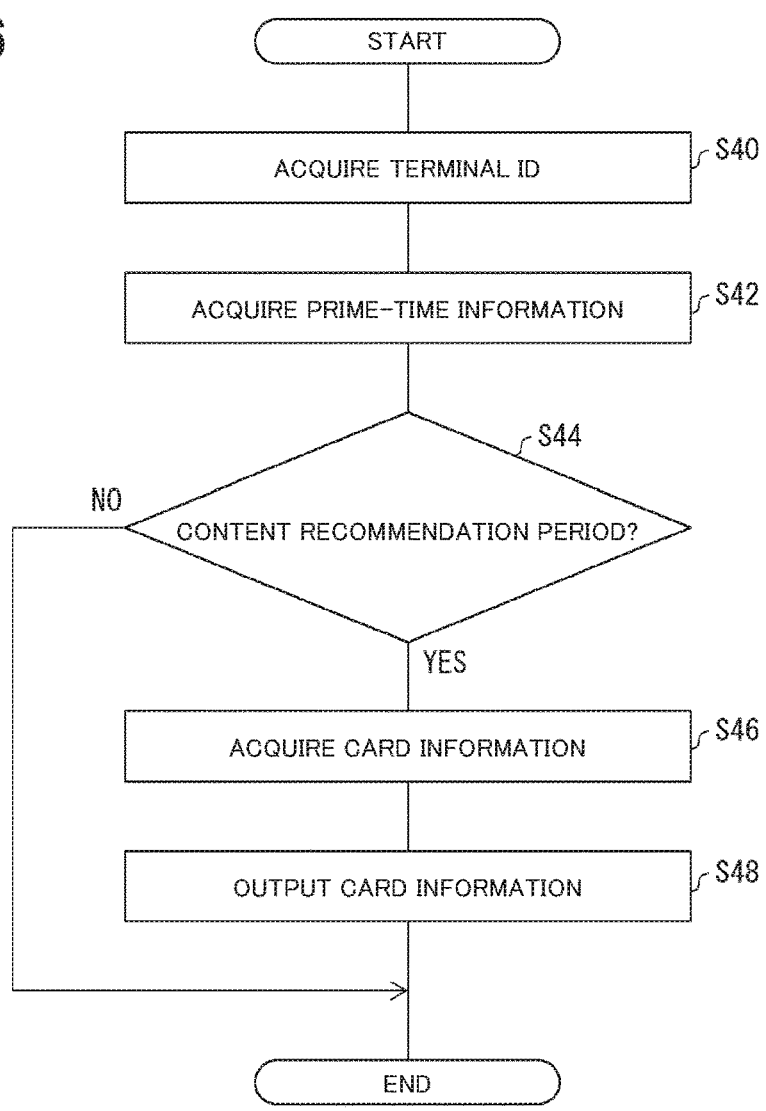
FIG. 5 illustrates an example of the prime-time table in the first embodiment of the present invention.
FIG. 6 is a flowchart illustrating a process in which the content recommendation apparatus according to the first embodiment of the present invention outputs card information.

With reference to FIG. 5, the following describes the prime-time table. FIG. 5 illustrates an example of the prime-time table in the present embodiment. In the prime-time table in FIG. 5, the prime time is managed hourly.

As shown in FIG. 5, the prime-time table shows the association between each terminal ID and prime-time information that indicates the type of application and the prime time. In other words, the prime-time table in FIG. 5 shows the association between a terminal and information about when the prime time of a target application is.

In a terminal with ID No. ATV010001 for instance, the prime time of a VOD application is 13:00, 14:00, and 15:00. In other words, the terminal with ID No. ATV010001 uses the VOD application frequently during an hour starting from 13:00, an hour starting from 14:00, and an hour starting from 15:00.

In addition, a terminal with ID No. ATV010002 uses the VOD application frequently during an hour starting from 20:00, an hour starting from 21:00, and an hour starting from 22:00. The terminal with ID No. ATV010002 uses a music application frequently during an hour starting from 10:00 and an hour starting from 11:00.

(Process of Outputting Card Information)

With reference to FIG. 6, the following describes a process in which the content recommendation apparatus 10 outputs the card information (i.e., a method of content recommendation). FIG. 6 is a flowchart illustrating a process in which the content recommendation apparatus 10 in the present embodiment outputs the card information.

(Step S40)

The card composing unit 148 of the content recommendation apparatus 10 acquires a terminal ID indicating a target terminal. In some embodiments, the card composing unit 148 may determine the terminal ID of the target terminal, instead of acquiring the terminal ID.

(Step S42)

The card composing unit 148 refers to the prime-time-table storage 20 and then acquires the prime-time information associated with the terminal ID acquired in Step S40.

(Step S44)

The card composing unit 148 refers to the prime time indicated by the acquired prime-time information, and then determines whether the current time falls under a content-recommendation time period that is prior to the prime time. In other words, the card composing unit 148 refers to the history information corresponding to the prime time, to determine whether the current time falls under the content-recommendation time period.

Here, examples of the content-recommendation time period include a period of time that is immediately prior to the prime time (e.g., a period of time starting from an hour before and ending before the prime time, a period of time that is next to the prime time), a period of time ranging from a first predetermined time before the prime time to a second predetermined time before the prime time (e.g., a period of time ranging from 10 to 9 hours before the prime time, a period of time that is not next to the prime time), and a predetermined period of time that is prior to the prime time (e.g., 8:00 a.m. to 9:00 a.m.).

In some cases, the content recommendation apparatus 10 acquires, from the display apparatus 40, information indicating that the power source of the display apparatus 40 has switched ON (or OFF). Accordingly, the content-recommendation time period may be a predetermined period of time after the acquisition of this information indicating that the power source of the display apparatus 40 has switched ON. Let the content-recommendation time period be 30 minutes after the acquisition of the information indicating that the power source of the display apparatus 40 has switched ON. Accordingly, contents can be recommended at the point when the power source has switched ON.

(Step S46: Selecting Step)

If determining that the current time falls under the content-recommendation time period in Step S44 (i.e., if YES in Step S44), the card composing unit 148 selects an application type indicated by the prime-time information. Hereinafter, this application type will be referred to as a prime-time app (i.e., particular category). In other words, the card composing unit 148 selects the prime-time app by referring to the history information corresponding to the prime time.

The card composing unit 148 further selects recommendation contents in the prime time. Here, the card composing unit 148 selects more contents of the prime-time app than contents of an app other than the prime-time app. The card composing unit 148 then acquires, from the card-information storage 16, card information including recommendation-content information about the contents selected as recommendation contents. The card composing unit 148 outputs the acquired card information to the card-information outputting unit 150.

(Step S48: Outputting Step)

The card-information outputting unit 150 outputs the acquired card information to the display apparatus 40 via the content-recommendation-apparatus communication unit 12. In other words, the card-information outputting unit 150 outputs the card information including the recommendation-content information about the recommendation contents, during a period of time that is prior to the prime time.

(Cards that are Displayed by Display Apparatus 40)

Figure 7:
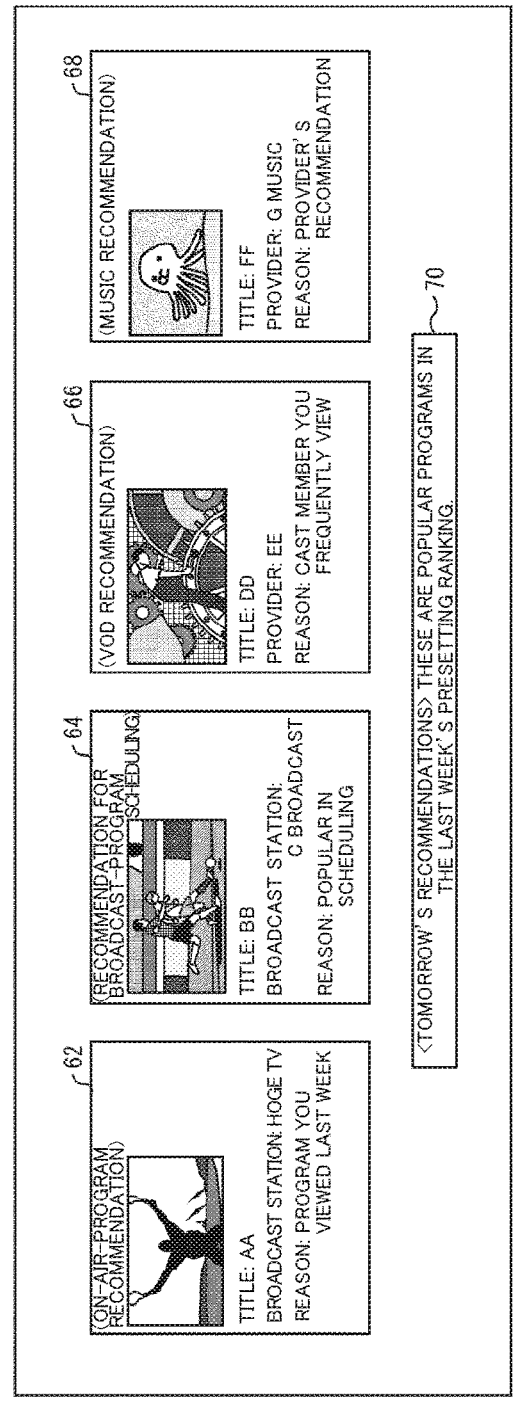
FIG. 7 illustrates exemplary cards displayed by a display apparatus according to the embodiments of the present invention.
Figure 7:
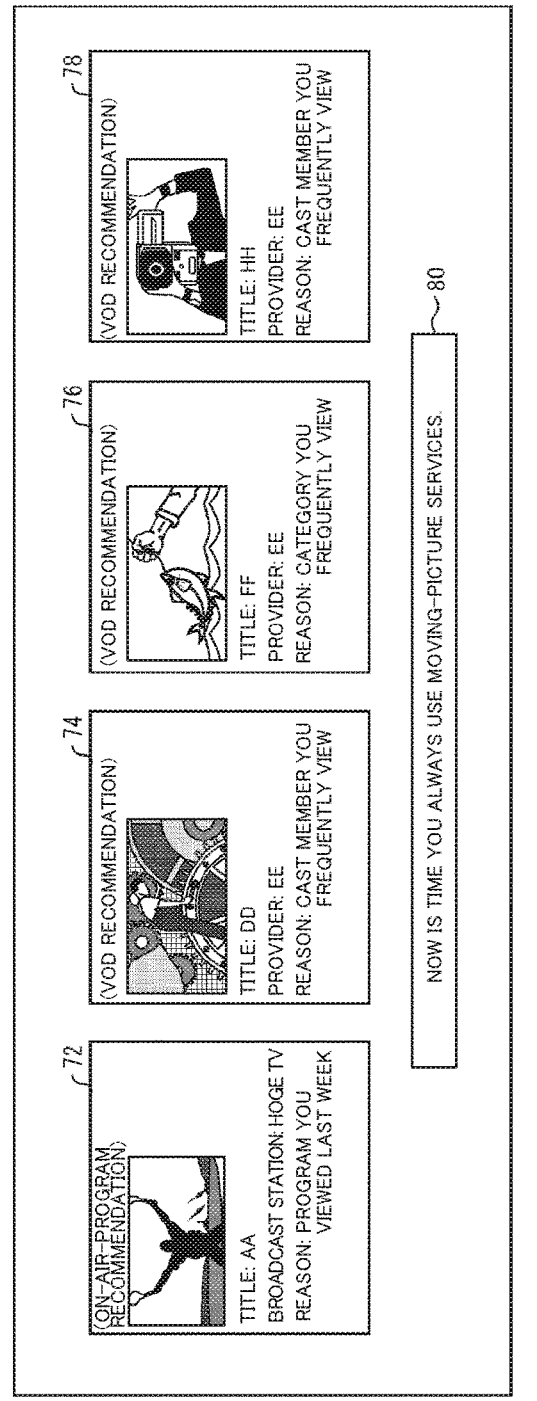

The configuration of cards that are displayed by the display apparatus 40 will be described with reference to FIG. 7. FIG. 7 illustrates exemplary cards that are displayed by the display apparatus 40 in the present embodiment. FIG. 7(a) illustrates exemplary cards that are displayed by the display apparatus 40 during a period of time except for a content-recommendation time period. FIG. 7(b) illustrates exemplary cards displayed by the display apparatus 40 during the content-recommendation time period.

During the period of time except for the content-recommendation time period, the content recommendation apparatus 10 outputs card information for displaying cards of contents corresponding to respective application types. Thus, during the period of time except for the content-recommendation time period, the display apparatus 40, as shown in FIG. 7(a), displays cards 62, 64, 66, and 68, which are cards of contents corresponding to respective application types. It is noted that the content recommendation system 1 may be configured such that the display apparatus 40 displays, along with the cards 62, 64, 66, and 68, a text 70 indicating a reason for selecting these cards (i.e., contents). Other examples of the text 70 include a text saying, "This dram will be on air tomorrow" and a text saying, "This is the program on which Mr./Ms. XXXX appears". Instead of (or in addition to) the configuration where the display apparatus 40 displays the text 70, the content recommendation apparatus 10 may be configured such that the details of the text 70 are notified by another means, such as sound. This configuration will be detailed in another embodiment. In addition, this configuration holds true for a text 80 that will be described later on.

During the content-recommendation time period, the content recommendation apparatus 10 outputs card information for displaying a card of a content corresponding to a prime-time app. Thus, the display apparatus 40, as shown in FIG. 7(b), displays cards 74, 76, and 78 of contents corresponding to a VOD application, which is a prime-time app.

During the content-recommendation time period, the content recommendation apparatus 10 may display, along with these cards, a text 80 indicating a reason for recommending the contents of the prime-time app. In other words, in addition to the recommendation-content information, the content recommendation apparatus 10 may output card information including information indicating the text 80. In FIG. 7(b), the text 80 allows a user to know why the contents of the VOD application have been recommended.

When the content-recommendation time period is a predetermined period of time that is prior to the prime time, the content recommendation apparatus 10 may display information indicating that the recommendation contents are for the prime time. In other words, in addition to the recommendation-content information, the content recommendation apparatus 10 may output card information including information indicating that the recommendation-content information is for the prime time. In this case, instead of the text 80 in FIG. 7, the content recommendation apparatus 10 displays a text saying, "How about this content today?" or a text saying, "How about this content tonight?", for instance.

The wording "for the prime time" herein means a content recommended to be replayed (or executed) in the prime time. Examples of such a content include a moving picture recommended to be viewed in the prime time, and a game recommended to be executed in the prime time.

In the content recommendation system 1, any number of cards of contents corresponding to the prime-time app may be displayed. For instance, as shown in FIG. 7(b), a single card 72 of a content corresponding to an application type other than the prime-time app may be displayed in the space, and the cards 74, 76, and 78 of the contents corresponding to the prime-time app may be displayed in the rest of the space. Alternatively, a half number of displayable cards may be displayed.

The content recommendation apparatus 10 in the content recommendation system 1 may output the card information to another terminal that is not shown in FIG. 1. Examples of the other terminal include a smartphone and a tablet terminal. In this case, the content recommendation apparatus 10 associates in advance the terminal ID of the display apparatus 40 with a terminal ID for identifying the other terminal. The content recommendation apparatus 10 may then output the card information to the other terminal, instead (or as well as) to the display apparatus 40.

As described above, the content recommendation system 1 is configured such that the content recommendation apparatus 10 includes the history-information storage 18 and the prime-time-table storage 20, which store a view history of a content. The content recommendation apparatus 10 also includes the content-recommendation-apparatus communication unit 12 and the content-recommendation-apparatus controller 14. The content-recommendation-apparatus controller 14 selects a particular category (i.e., prime-time app) from among multiple categories by referring to the view history corresponding to a prime time. The content-recommendation-apparatus controller 14 also selects, as recommendation contents in the prime time, more contents of the particular category than contents of the other categories. The content-recommendation-apparatus controller 14 also outputs recommendation-content information about the selected recommendation contents via the content-recommendation-apparatus communication unit 12 during a period of time that is prior to the prime time (i.e., a period of time prior to a particular period of time). Such a configuration enables the content recommendation system 1 to recommend a suitable content timely.

The content recommendation system 1 may be also configured such that the content recommendation apparatus 10 outputs the recommendation-content information during a period of time that is immediately prior to the prime time. This configuration enables the content recommendation system 1 to recommend, immediately before the prime time, a content corresponding to the prime-time app that is frequently executed by the user during the prime time.

The content recommendation system 1 may be also configured such that the content recommendation apparatus 10 outputs the recommendation-content information during a content-recommendation time period, which is a predetermined period of time prior to the prime time. This configuration enables the content recommendation system 1 to recommend, during morning hours, a content corresponding to the prime-time app that is frequently executed by the user in a night prime time.

The content recommendation system 1 may be also configured such that the content recommendation apparatus 10 outputs, along with the recommendation-content information, information indicating a reason for recommending the content of the prime-time app. This configuration enables the content recommendation system 1 to let the user know a reason for recommending contents in a VOD application when there are many contents recommended in the VOD application.

The content recommendation system 1 may be also configured such that the content recommendation apparatus 10 outputs, along with the recommendation-content information, information indicating that the recommendation-content information is for the prime time. This configuration enables the content recommendation system 1 to let the user know that the prime time is approaching, and that there is a content recommended in the prime time.

Second Embodiment

The foregoing embodiment has described content recommendation through display. The content recommendation may be implemented by any means other than display. The second embodiment describes content recommendation by sound as well as by display. Components whose functions are the same as those described in the foregoing embodiment are denoted by the same signs and will not be elaborated upon.

(Content Recommendation System 1a)

The present embodiment provides a content recommendation system 1a that includes the content recommendation apparatus 10 and a display apparatus 40a.

The display apparatus 40a includes an utterance unit (i.e., notification unit) 50 in addition to the components included in the display apparatus 40. The display apparatus 40a also includes a display-apparatus controller 44a instead of the display-apparatus controller 44.

The display-apparatus controller 44a functions also as an utterance controller 446 in addition to as the history-information outputting unit 442 and display controller 444. The utterance controller 446 controls the utterance unit 50 to utter a sound from the utterance unit 50.

The utterance unit 50 is a device that can output a sound.

Although the present embodiment describes content recommendation by sound as well as by display, the content recommendation may be implemented using any method by which a user can be notified of a recommendation content.

(Instance of Utterance)

The content recommendation system 1a is configured such that the display apparatus 40a notifies, by utterance, the user of the detailed text 80 shown in FIG. 7. For instance, the utterance controller 446 refers to card information, and controls the utterance unit 50 to utter a voice saying, "Now is the time when you always use the moving-picture service". This configuration enables the content recommendation system 1a to notify that now is a particular time to the user.

Third Embodiment

A third embodiment describes an instance where there are multiple content-recommendation time periods provided in a content recommendation system 1b. Components whose functions are the same as those described in the foregoing embodiments are denoted by the same signs and will not be elaborated upon.

Like the content recommendation system 1 in the foregoing embodiment, the content recommendation system 1b includes the content recommendation apparatus 10 and the display apparatus 40.

In the content recommendation system 1b, the content recommendation apparatus 10 provides multiple content-recommendation time periods. For instance, the content recommendation apparatus 10 provides, as content-recommendation time periods, a period of time starting from an hour before a prime time and ending before the prime time, and a period of time ranging from 8:00 a.m. to 9:00 a.m. In this case, the content recommendation apparatus 10 outputs first card information for content recommendation, by 8:00 a.m. to 9:00 a.m. The content recommendation apparatus 10 thereafter outputs second card information for content recommendation, during the period of time starting from an hour before the prime time and ending before the prime time.

Here, the contents recommended using the respective first card information and second card information may be identical to or different from each other (nevertheless, these contents fall under the same category). When the contents recommended using the respective first card information and second card information are identical to each other, the content recommendation apparatus 10 can notify the user of the content recommended in the morning, again just before the prime time. When the contents recommended using the respective first card information and second card information are different from each other, the content recommendation apparatus 10 can recommend many contents of the same category to the user, because these contents, although different from each other, fall under the same category.

Fourth Embodiment

The content recommendation apparatus 10, although implemented by a single server in the foregoing embodiments, may be implemented by multiple servers. Accordingly, a content recommendation system can be achieved using a server configuration desired by a business entity who provides the content recommendation system 1 (or content recommendation system 1a or 1b).

In using multiple servers, the servers may be managed by the same business entity or by business entities different from each other.

The content recommendation apparatus 10 and display apparatus 40 may be integrated. In this case, the card-information outputting unit 150 of the content-recommendation-apparatus controller 14 may output card information including recommendation-content information, to the display unit (i.e., output unit) 46 and utterance unit (i.e., output unit) 50.

Fifth Embodiment

The block of the content recommendation apparatus 10 and the block of the display apparatus 40 (or display apparatus 40a) may be each implemented by a logic circuit (i.e., hardware) formed in, for instance, an integrated circuit (i.e., IC chip), or may be each implemented by software that is executed by, for instance, one or more processors. For software, each of the content recommendation apparatus 10 and display apparatus 40 (or display apparatus 40a) can be configured using a computer (i.e., electronic computation device) as shown in FIG. 8.

Figure 8:
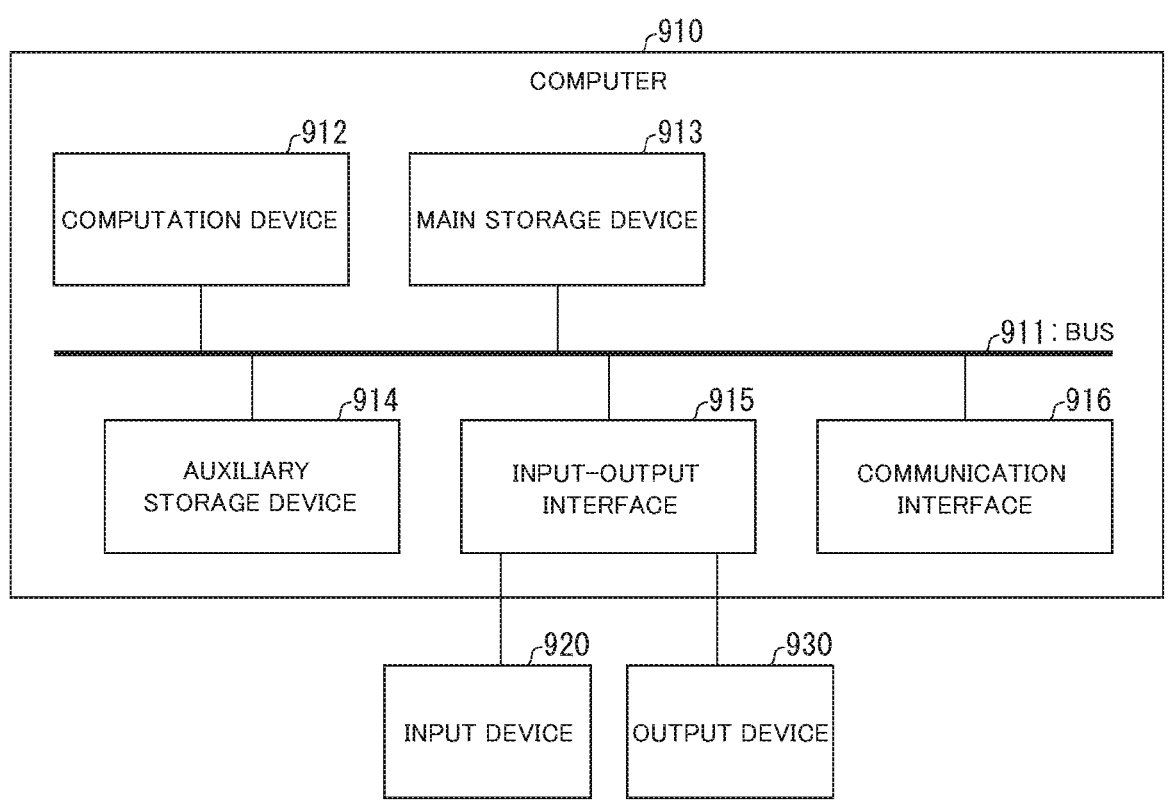
FIG. 8 is a block diagram illustrating the hardware configuration of a computer that is usable as the content recommendation apparatus, as a user management server, and as the display apparatus.

FIG. 8 is a block diagram illustrating the configuration of a computer 910 that is usable as the content recommendation apparatus 10 and display apparatus 40 (or display apparatus 40a). The computer 910 includes a computation device 912, a main storage device 913, an auxiliary storage device 914, an input-output interface 915, and a communication interface 916 that are mutually connected via a bus 911. The computation device 912, main storage device 913, and auxiliary storage device 914 may be respectively, for instance, one or more processors (e.g., CPUs), a random access memory (RAM), and a hard disk drive. The input-output interface 915 is connected to an input device 920 through which a user inputs various pieces of information to the computer 910, and is also connected to an output device 930 through which the computer 910 outputs various pieces of information to the user. The input device 920 and output device 930 may be integrated inside the computer 910 or connected (i.e., externally connected) to the computer 910. The input device 920 may be, but not limited to, a keyboard, mouse, or touch sensor. The output device 930 may be, but not limited to, a display, printer, or speaker. Moreover, a device such as a touch panel with a touch sensor and display integrated together may be used that serves as both the input device 920 and the output device 930. The communication interface 916 is used for communication between the computer 910 and an external device.

The auxiliary storage device 914 stores various programs for operating the computer 910 as the content recommendation apparatus 10 and display apparatus 40 (or display apparatus 40a). The computation device 912 deploys the programs stored in the auxiliary storage device 914 into the main storage device 913 to execute commands contained in the programs, thus causing the computer 910 to function as each unit included in the content recommendation apparatus 10 and in the display apparatus 40 (or display apparatus 40a). The auxiliary storage device 914 includes a recording medium for recording information, such as programs. The recording medium needs to be a computer-readable "non-transitory tangible medium", and may be, but not limited to, a tape, disk, card, semiconductor memory, or programmable logic circuit.

The aforementioned programs may be acquired from the outside of the computer 910, and in this case, may be acquired via any transmission medium (e.g., a communication network and a broadcasting wave). The present invention can be also implemented in the form of data signals that contain the aforementioned programs embodied by electronic transmission, and that are embedded in carrier waves.

The present invention is not limited to each of the foregoing embodiments. Various modifications can be devised within the scope of the claims. The technical scope of the present invention encompasses an embodiment that can be obtained in combination, as necessary, with the technical means disclosed in the respective different embodiments. Furthermore, combining the technical means disclosed in the respective different embodiments can form a new technical feature.

The invention claimed is:

1. A content recommendation apparatus comprising:
   storage storing instructions;
   an output unit; and
   a processor executing the stored instructions to:
      store, in the storage, view histories of contents executed during a predetermined period that is longer than a day, each of the view histories including information indicating an application for which a content has been executed and indicating a time at which the content has been executed;

select an application executed during a particular period of time within the predetermined period, by referring to at least one of the view histories corresponding to the particular period of time, the particular period of time being one of a plurality of periods of time of a day sectioned for an individual unit time;

select, as recommendation contents in the particular period of time, more contents that are executed by the selected application than contents that are executed by an application other than the selected application; and output recommendation-content information about the selected recommendation contents via the output unit when a current time falls under a content-recommendation time period that is prior to the particular period of time.

2. The content recommendation apparatus according to claim 1, wherein the processor further outputs the recommendation-content information during the content-recommendation time period that is immediately prior to the particular period of time.

3. The content recommendation apparatus according to claim 1, wherein the processor further outputs the recommendation-content information during the content-recommendation time period.

4. The content recommendation apparatus according to claim 1, wherein the processor further outputs, along with the recommendation-content information, information indicating a reason for recommending the contents that are executed by the selected application.

5. The content recommendation apparatus according to claim 1, wherein the processor further outputs, along with the recommendation-content information, information indicating that the recommendation-content information is for the particular period of time.

6. The content recommendation apparatus according to claim 1, wherein for a plurality of applications of the same type that replay contents, the processor further selects, as applications of the same type, an application for executing the content when a plurality of contents of the same type are replayed by applications different from each other.

7. A method of content recommendation, comprising:

storing, in a storage, view histories of contents executed during a predetermined period that is longer than a day, each of the view histories including information indicating an application for which a content has been executed and indicating a time at which the content has been executed;

selecting an application executed during a particular period of time within the predetermined period, by referring to at least one of the view histories corresponding to the particular period of time, the particular period of time being one of a plurality of periods of time of a day sectioned for an individual unit time;

selecting, as recommendation contents in the particular period of time, more contents that are executed by the selected application than contents that are executed by an application other than the selected application; and outputting recommendation-content information about the selected recommendation contents when a current time falls under a content-recommendation time period that is prior to the particular period of time.

8. A content recommendation system comprising:

a content recommendation apparatus; and a notification apparatus, the content recommendation apparatus comprising storage storing instructions, an output unit, and a content-recommendation-apparatus processor, the content-recommendation-apparatus processor executing the stored instructions to:

store, in the storage, view histories of contents executed during a predetermined period that is longer than a day, each of the view histories including information indicating an application for which a content has been executed and indicating a time at which the content has been executed;

select an application executed during a particular period of time within the predetermined period, by referring to at least one of the view histories corresponding to the particular period of time, the particular period of time being one of a plurality of periods of time of a day sectioned for an individual unit time;

select, as recommendation contents in the particular period of time, more contents that are executed by the selected application than contents that are executed by an application other than the selected application; and output recommendation-content information about the selected recommendation contents to the notification apparatus via the output unit when a current time falls under a content-recommendation time period that is prior to the particular period of time, the notification apparatus comprising an acquisition unit, a notification unit, and a notification-apparatus processor, the notification-apparatus processor executing the stored instructions to refer to the recommendation-content information acquired via the acquisition unit, and notify information about the recommendation contents via the notification unit.

* * * * *